Patented Dec. 27, 1932

1,891,979

UNITED STATES PATENT OFFICE

ALBERT M. HANAUER, OF PITTSBURGH, PENNSYLVANIA, ASSIGNOR TO LAVA CRUCIBLE COMPANY OF PITTSBURGH, OF PITTSBURGH, PENNSYLVANIA, A CORPORATION OF PENNSYLVANIA

METHOD OF MOLDING GRAPHITE REFRACTORY COMPOSITIONS

No Drawing. Application filed December 28, 1931. Serial No. 583,610.

This invention relates to the molding of graphite composition articles, and it is among its objects to provide a simple method for accelerating drying of such articles, particularly in large sizes and intricate shapes, and for simultaneously avoiding shrinkage cracking.

Graphite articles are usually formed from compositions containing graphite and bonding agent, with or without other refractory materials. These compositions are rendered moldable by mixing them with water. Shrinkage cracking upon drying of such articles is a direct function of the amount of water used. With small amounts of water such cracking may be minimized, but the mixes are difficult to mold. Larger amounts of water render the mass plastic and easily moldable, and the moisture is distributed uniformly, and consequently the common practice has been to use relatively large amounts of water in preparing the batches for molding. The use of large quantities of water, however, requires careful drying, to avoid shrinkage cracking, especially in producing large crucibles, retorts, ingot molds and the like, because of their size and the large amount of water to be evaporated. Accordingly drying of articles formed from such batches, particularly large articles, has been an unduly prolonged operation. Up to the time of this invention no means known to me has been available for overcoming these difficulties.

The invention is predicated upon my discovery that the drying of graphite articles may be accelerated without prejudicially affecting the moldability of the batches by the use of compositions compounded with a liquid more volatile than water, and that especially desirable results are had by replacing part of the water normally used in the batch with a liquid of greater volatility. Thus, in the preferred embodiment, the water, which is relatively slow to evaporate under the conditions usually used for drying these articles, is replaced in part by a liquid which maintains the plasticity desired for molding and is readily volatile. In articles formed from such compositions the volatile liquid evaporates rapidly from the formed article, there is less water to be removed by drying, and there is less shrinkage. As a result the drying characteristics of low water batches are obtained, and the disadvantages of such batches are avoided.

The acceleration of the drying time is dependent in large part upon the proportion of volatile liquid used. Thus, the greater the proportion of volatile liquid, the more rapid is the drying of the formed article. The proportions may be varied according to need, the chief criterion being to so proportion the amounts of water and other liquid as to provide satisfactory plasticity and drying characteristics. I have found that, in general, up to about half the water normally used in making batches may be replaced by these volatile liquids with satisfactory results.

In the practice of the invention the volatile liquid may be miscible with water, such as alcohol, but for most purposes it is preferred to use liquids immiscible with water, such as gasoline, carbon tetrachloride, and the like. These immiscible liquids seem to evaporate more quickly from the molded articles than those which are miscible with water. Also, the immiscible liquids appear to act as lubricants between the grains of the composition.

The invention may be described further with reference to the manufacture of refractory graphite crucibles, such as those made from compositions customarily used in this art, containing approximately 50% graphite, 35% bonding clay, and 15% refractory material, such as silicon carbide. In the practice of the invention such composition is mixed with about 2¾ to 3 gallons of water for each 100 pounds of batch, the water being heated approximately to the boiling point. After thorough mixing to distribute the water and other constituents uniformly, the batch is aged in the customary manner.

The amount of water added is sufficient for aging, but is not enough for the best molding. In accordance with this invention the batch is brought to suitable consistency just prior to use by mixing with a liquid of greater volatility than water, for instance by adding and mixing in sufficient gasoline to bring the batch to proper plasticity for molding. Thus in the example given there may be added 1 to 2 quarts of gasoline per 100 pounds of batch. The articles, such as large graphite crucible, ingot molds, retorts, and the like, are then molded, for instance, on a jigger, and after being formed and finished they are dried according to any desired procedure.

After drying has been completed the articles are fired in the usual way, after which they may be glazed and refired, these steps being customary and well understood in this art. Thereafter, the ingot mold, crucible, or other molded article may, if necessary, be turned out to finished dimensions according to any suitable procedure.

The gasoline, or other volatile liquid used, evaporates rapidly during drying, and thereby substantially reduces the drying time as compared with crucibles made from compositions compounded with water alone. The residual water in the batch then evaporates. The relatively low water content, as compared with standard practice, avoids shrinkage cracking. Particular advantages attend the practice of the invention in connection with making very large graphite crucibles, ingot molds, retorts and other massive articles, which it has been necessary to dry very slowly. For instance, ingot molds 50 inches high and 12 inches in diameter made from the foregoing composition may be dried satisfactorily in about two weeks, as compared with four to five weeks ordinarily required when water only is used in accordance with the best practice prior to my invention.

According to the provisions of the patent statutes, I have explained the principle and mode of practicing my invention, and have described what I now consider to be its best embodiment. However, I desire to have it understood that, within the scope of the appended claims, the invention may be practiced otherwise than as specifically described.

I claim:

1. In the production of molded articles from graphite compositions containing water, the method of accelerating drying of the formed article comprising replacing part of the water used in making said compositions by a liquid more volatile than water.

2. In the production of molded articles from graphite compositions containing water, the method of accelerating drying of the formed article comprising replacing part of the water used in making said mixtures by a liquid more volatile than and immiscible with water.

3. In a method of molding graphite compositions, the step comprising forming the article from a composition containing graphite, bonding agent, water and a liquid more volatile than water, said liquid and water being proportioned to effect accelerated drying of the formed article and to minimize shrinkage cracking in drying, as compared with mixes of comparable plasticity made from water alone.

4. In a method of molding graphite compositions, the step comprising forming the article from a composition containing graphite, bonding agent, water and a liquid more volatile than and immiscible with water, such as gasoline, said liquid and water being proportioned to cause accelerated drying of the formed article and to minimize shrinkage cracking in drying, as compared with mixes of comparable plasticity made from water alone.

5. In a method of molding large crucibles, ingot molds, retorts and the like from graphite compositions, the step comprising forming the articles from a composition containing graphite, refractory, bonding clay, a liquid more volatile than water and immiscible therewith, such as gasoline, in an amount adapted to cause accelerated drying of the formed article, as compared with mixes made from water alone, and water in an amount to provide plasticity for molding.

6. In a method of molding large crucibles, ingot molds, retorts and the like from graphite compositions, the step comprising forming the article from a composition containing graphite, bonding agent, water, and liquid more volatile than water and immiscible therewith, the amount of said liquid being at least such as to substantially accelerate the drying of the formed article, as compared with articles formed from batches containing water alone, and being not substantially more than about 50 per cent of the amount of water needed for compounding such compositions with water alone.

7. In the production of molded articles from graphite compositions containing water, the method accelerating drying of the formed article comprising replacing part of the water used in making said mixtures by a liquid more volatile than and miscible with water.

In testimony whereof, I sign my name.

ALBERT M. HANAUER.